Aug. 30, 1966 C. R. TARVER 3,269,628

TAPE GUIDE POST

Filed Nov. 23, 1964

INVENTOR
CARL R. TARVER
BY

ATTORNEY

United States Patent Office 3,269,628
Patented August 30, 1966

3,269,628
TAPE GUIDE POST
Carl R. Tarver, Canoga Park, Calif., assignor to The Bunker-Ramo Corporation, Stamford, Conn., a corporation of Delaware
Filed Nov. 23, 1964, Ser. No. 413,026
12 Claims. (Cl. 226—199)

This invention relates generally to means for controlling the motion of materials of different characteristics, and more particularly to a post for guiding the motion of materials of differing widths in devices utilizing them, such as tapes of different widths used in tape devices.

Whenever material of substantial length is to pass through a device which utilizes it, it is generally desirable to guide the material in a lateral direction with close tolerance. It is also desirable that the guiding be performed with a minimum amount of friction so that the material is not subjected to wearing effects and that the force necessary to move the material is not increased. For example, in a device such as a tape recorder used to record information on tape or read information therefrom, it is important that the tape pass through the device in as smooth and uniform a manner as possible so that the signals may be recorded or read in a uniform manner and that the tape not be excessively worn or damaged. The need to so control the motion of tape is particularly great when tape is utilized in a device which operates at high speeds, since the higher the speed of operation the less uniform may the lateral or sideways motion of the tape be unless it is properly guided through the device.

To provide for such tape guiding, posts have been designed whose function is to control the uniformity of motion of tape through tape utilizing devices. Such posts are often of an adjustable type so as to accommodate tapes of different widths which may be utilized by the same device.

In one example of the prior art, a tape guide post comprises a main tape guide support which is mountable on an instrument panel of a tape utilizing device. A roller is coupled to the tape guide support so that the roller may rotate thereabout. A roller adjust shaft having a threaded portion is inserted through the roller and the tape guide support to the back of the instrument panel. The roller adjust shaft is threaded into a housing which comprises a pair of clips capable of coupling the back of the main tape guide support, by clipping into pairs of slots or notches therein. The tape guide post heretofore described guides tape which is moved over the roller. Since the roller is rotatable, the friction produced by the moving tape on the roller is reduced because the roller tends to rotate in a direction of the moving tape. The length of the section of the roller exposed to the moving tape may be varied by pulling or pushing on the roller adjust shaft so that the housing into which the roller adjust shaft is threaded may be coupled to the main tape guide support in different points by positioning the clips in different pairs of slots or notches thereof. Minor width adjustments may be accomplished by turning the roller adjust shaft.

Although the post heretofore described is adjustable to accommodate tapes of different widths and by using it the amount of friction produced by the tape on the post is reduced, it is not completely satisfactory since some of the portions of the post that guide the tape edges are stationary with respect to the tape. As a result, the tape, when being pulled or moved past the post at relatively high speeds, inevitably scrapes or rubs against these stationary post portions, and, since the post is generally metallic, which is considerably harder than the tape material, the tape tends to become excessively worn and frayed along its edges. Such tape wearing or fraying is most undesirable since, besides the tape width being irregularly reduced, the material of the tape which has been scraped off creates dust particles. Such particles often interfere with the operation of electro-optical readers, which are responsive to light passing through holes punched in the tape, since the light transmitted through the tape may partially be blocked off by such impurities in the air.

The present invention overcomes the prior art disadvantages by providing an improved tape guide post which, besides being adjustable so as to guide tapes of different widths, has all of its portions, which may come into contact with tape moving thereon, adapted to be rotatable. As a result, the guided tape which may be moved past the guide post at relatively high speeds produces minimum frictional forces, resulting in smooth tape guiding without the tape scraping or rubbing against the metallic post portions, thereby substantially eliminating any tape wearing or fraying. The following description will refer to a guide post used in tape utilizing devices. However, it is apparent that the invention may be practiced to guide materials other than tape and, therefore, the specific examples are being presented in explanatory purposes only.

The novel features of the improved tape guide post of the invention will be better understood from the following description taken in conjunction with the accompanying drawings, in which.

Figures 1, 2, 3:
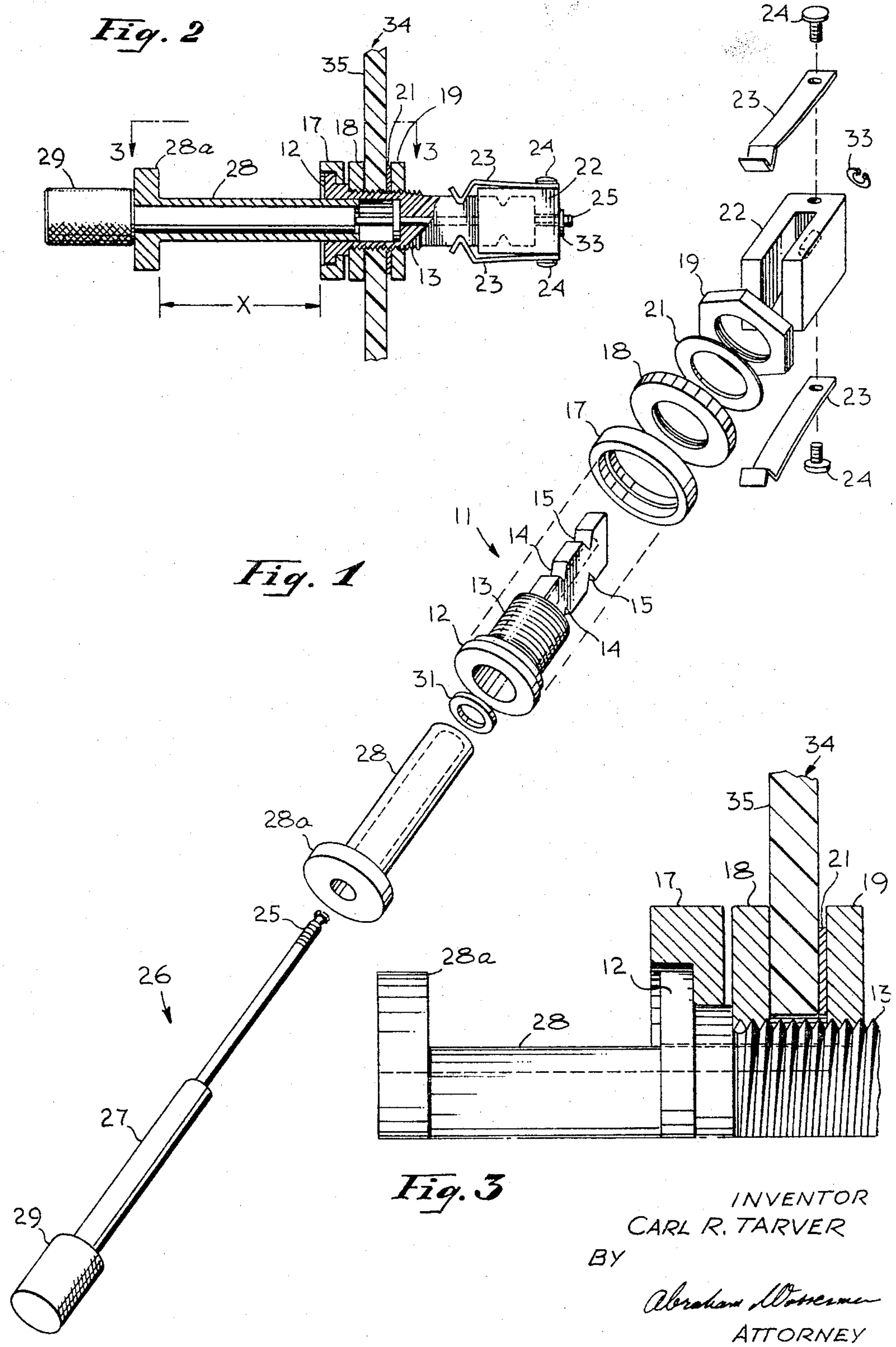
FIGURE 1 is an exploded perspective view of the present invention.
FIGURE 2 is a side elevational view, partially in section, of the improved tape guide post of the invention.
FIGURE 3 is an enlarged view of a portion of FIGURE 2.

Referring to FIGURE 1, there is shown an exploded perspective view of an improved tape guide post comprising a main tape guide support 11, having one disc shaped end 12 to provide a shoulder, a threaded portion 13 and pairs of notches or grooves 14 and 15 in its upper and lower surfaces. The support 11 has a clearance opening along its longitudinal axis. A tape guide ring 17 is adapted to be mounted on the disc shaped end 12 of the support 11. Retainer nuts or tapped rings 18 and 19 and a lock washer 21 fasten or couple the support 11 to a panel of a tape utilizing device with at least the tape guide ring 17 being positioned on the front of the panel, as will be more clearly shown hereinafter. The tape guide post also comprises a U-shaped housing 22 to the upper and lower sides of which a pair of spring clips 23 are fastened by means of a pair of machine screws 24. In addition, the housing 22 has a portion tapped therethrough (best seen in FIGURE 2), so that a threaded end portion 25 of a roller adjust shaft 26 may be coupled thereto. The roller adjust shaft 26 has a roller support section 27 onto which a roller 28 is coupled and retained thereon by means of a retaining ring 31. The roller 28 is maintained adjacent a shoulder on the shaft 26 formed by a knob 29. The roller 28, which is cylindrical in shape and has a shoulder formed by a disc-shaped end 28*a*, is adapted to be rotatable about the roller support section 27.

In assembling the guide post, the tape guide ring 17 is mounted on the main tape guide support 11 and then the support is fastened to the panel to which it is to be mounted by means of the nuts 17 and 19 and the lock washer 21. The roller adjust shaft 26 with the roller 28 and the retaining ring 31 mounted thereon is then directed through the clearance opening of the main tape guide support 11 towards the back of the panel to which the support 11 is fastened. The parts are so designed that the threaded end 25 of the roller adjust shaft 26 protrudes through the back end of the support 11 and is threaded into the tapped portion of the housing 22. To insure that the shaft 26 once coupled to the housing 22 cannot inadvertently be decoupled from it, a retaining clip 33 may be fastened to the end of the threaded end 25 after it has been threaded through the housing 22 so that the two parts (26 and 22) cannot be separated without first removing the retaining clip 33 from the end 25.

In FIGURE 2, the tape guide post of the invention is shown assembled and fastened to a panel 34 having a front face 35. From the foregoing description, it is seen that by pulling on the shaft knob 29, the housing 22 in the back of the panel 34 may be pulled towards the panel until the pair of clips 23 engage the pair of slots 15. Thus, the dimension indicated by the letter X between the outer face of the ring 17 and the disc shaped end 28*a* of the roller 28 may be held substantially constant. This dimension is generally determined by the width of the tape to be guided. For example, the slots 15 may be so located that when the clips 23 are engaged therein, the dimension X is substantially equal to eleven sixteenths of an inch, which is the width of conventional five-level punched tape. Fine adjustment of the dimension X may be accomplished by turning the knob 29 so that the threaded end 25 is screwed in and out of the housing 22, thereby controlling the position of the adjust shaft 26 as well as the roller 28 mounted thereon with respect to the rest of the tape guide post.

It seems apparent that by pulling on the knob 29, the dimension X may be increased for tapes of other widths. For example, the pair of slots 14 may be located so that when the clips 23 are engaged therein, the dimension X substantially equals the width of a seven-level or an eight-level punched tape. Again, fine adjustment may be accomplished by turning the knob 29. Although in FIGURES 1 and 2 the main tape guide support 11 is shown as having two pairs of slots 14 and 15, it is clear that any number of pairs of slots may be machined therein for adjusting the dimension X to any number of different widths of tapes to be guided.

Reference is now made to FIGURE 3 wherein the parts of the guide post which may come into contact with a tape guided thereby are shown. Tape is guided by moving over the roller 28 between its disc shaped end 28*a* and the tape guide ring 17. As described heretofore, the roller 28 rotates about the roller support section 27 of the roller adjust shaft 26 so that as the tape moves on the roller 28, it tends to roll or rotate in the direction of tape movement, thereby holding to a minimum any frictional forces created therebetween. The edges of the tape are guided by the roller edge 28*a* which is integral with the roller 28, and the tape guide ring 17, which is rotatably mounted on the end 12 (FIGURE 1) of the main tape guide support 11. As a result, the moving tape comes in contact only with rotatable parts of the guide post, all such parts tending to rotate in the direction of movement of the tape, so that friction forces between such parts and the tape are minimized, resulting in smooth guidance of the tape's motion. Further, since the parts guiding the edges of the tape are rotatable, the tape is protected from scraping or wearing, which is the case when parts of the post are stationary, as explained hereinbefore. In addition, the improved tape guide post of the present invention provides for simple adjustment of the post for guiding tapes of different widths.

Summarizing briefly, the present invention provides an improved tape guide post adapted to have the distance between certain parts thereof changed to correspond to the width of a tape to be guided thereby. Further, the improved post of the invention includes rotatable parts so that all parts thereof which may come in contact with the guided tape are rotatable to provide for improved performance with a minimum of frictional forces exerted on the tape and hence minimum wear thereof.

It is understood that many changes and modifications may be made by one skilled in the art without departing from the true spirit and scope of the invention.

What is claimed is:

1. In an adjustable guide post which has a main support adapted to be coupled to a panel and a housing with clips fastened thereto for coupling to a first end of said main support, the arrangement comprising:
 a guide ring rotatably mounted on said main support at a second end thereof; and
 adjustable means including a shaft and a rotatable roller mounted thereon adapted to have at least a portion thereof coupled to said housing through said main support.

2. In an adjustable post for guiding material which includes a main support member having first and second ends and a clearance opening therethrough, said member being adapted to be coupled to a panel of a device utilizing the material and a tapped member having a tapped opening and at least a single resilient clipping member fastened thereto for coupling said tapper member to said first end of said main support member with a predetermined spacing therebetween, the improvement comprising:
 a guide ring mounted on said second end of said main support member, said ring being rotatable thereabout;
 a roller having a circularly cylindrical shape with an opening along the longitudinal axis thereof and of a first substantially uniform cross sectional area except at one end thereof where the cross sectional area is greater than said first substantially uniform cross sectional area; and
 an adjustable shaft about which said roller is mounted along its longitudinal axis and adapted to rotate thereabout, said shaft having one threaded end coupled to said tapped member through said main support member by threading its threaded end into the tapped opening of said tapped member, said adjustable shaft further being rotatable so as to control the coupling between it and said tapped member, said roller and said tape guide ring being rotatable as a function of frictional forces exerted thereon by moving material which is guided thereby.

3. An adjustable tape guide post comprising:
 a main support member having a clearance opening along a longitudinal axis thereof and first and second ends, said first end being shoulder-shaped and at least one notch adjacent said second end, said main support member further having a threaded surface portion;
 a tape guide ring mounted on said shoulder-shaped end of said main support adapted to be rotated thereabout;
 tapped means adapted to fasten said main support member to a front panel of a device utilizing tape so that said shouldered end and said tape guide ring mounted thereon are disposed on the front of said front panel;
 a housing having at least one tapped opening;
 at least one resilient clip fastened to said housing and adapted to be clipped to said at least one notch in said main support member so as to couple said housing and said main support member with a preselected distance relationship;
 a cylindrical roller having a shoulder about one end thereof and an opening along its longitudinal axis; and
 an adjustable shaft having a shoulder about one end and a threaded surface portion near the other end, said shaft having said roller mounted near said shouldered end thereof so that the shouldered ends of said roller and said shaft are substantially adjacent one another, said roller being rotatable about said shaft, which is coupled to said housing by passing said at least the threaded portion of said shaft through the clearance opening of said main support member and threading at least a part of said threaded portion into said tapped opening of said housing.

4. An adjustable tape guide post comprising:

a main support member having a clearance opening along the longitudinal axis thereof, a shoulder about one end, at least one pair of notches near its other end and a portion of the surface thereof threaded;

a tape guide ring adapted to be mounted on the shoulder of said main support member so as to be rotatable thereabout;

a pair of tapped members adapted to be threaded on the threaded surface of said main support member so as to couple said support member to a front panel of a device utilizing tape so that the shoulder of said support member and said tape guide ring mounted thereon are disposed on the front of said front panel, said at least one pair of notches near the other end of said support member are disposed behind said front panel;

a housing having at least one tapped opening;

a pair of resilient clips fastened to said housing and adapted to couple said housing and said support member with a preselected distance relationship by being engaged in said at least one pair of notches in said support member, the axis of said at least one tapped opening in said housing and the axis of clearance opening of said support member being substantially aligned when said housing and support member are coupled with a preselected distance relationship;

a cylindrical roller having a shoulder about one end thereof and an opening along its longitudinal axis, the outside diameter of said cylindrical roller being substantially equal to but not greater than the clearance opening of said support member; and an adjustable cylindrical shaft having a shoulder about one end thereof, the shoulder having a diameter greater than the diameter of the opening along the longitudinal axis of said cylindrical roller and a portion of surface along its longitudinal axis on which said cylindrical roller is mounted so as to be rotatable thereabout, said shaft having a threaded end opposite said shouldered end, so that said threaded end is adapted to be coupled to said at least one tapped opening of said housing through the clearance opening of said support member by being threaded thereinto, said shaft being adapted to be moved in directions perpendicular to said front panel so that said clips fastened to said housing are engaged in said pair of notches in said support member, thereby substantially controlling the distance between said tape guide ring and the shoulder of said cylindrical roller, said distance being further controllable by varying the position of coupling of said shaft and said housing.

5. An adjustable tape guide post comprising:

a main support member having a clearance opening along the longitudinal axis thereof, a shoulder about one end, at least one pair of notches near its other end and a portion of the surface thereof threaded;

a tape guide ring adapted to be mounted on the shoulder of said main support member so as to be rotatable thereabout;

a pair of tapped members adapted to be threaded on the threaded surface of said main support member so as to couple said support member to a front panel of a device utilizing tape so that the shoulder of said support member and said tape guide ring mounted thereon are disposed on the front of said front panel and said at least one pair of notches near the other end of said support member are disposed behind said front panel;

a housing having at least one tapped opening;

a pair of resilient clips fastened to said housing and adapted to couple said housing and said support member with a preselected distance relationship by being engaged in said at least one pair of notches in said support member, the axis of said at least one tapped opening in said housing and the axis of clearance opening of said support member being substantially aligned when said housing and support member are coupled with a preselected distance relationship;

a cylindrical roller having a shoulder about one end thereof and an opening along its longitudinal axis, the outside diameter of said cylindrical roller being substantially equal to but not greater than the clearance opening of said support member; and an adjustable cylindrical shaft having a shoulder about one end thereof, the shoulder having a diameter greater than the diameter of the opening along the longitudinal axis of said cylindrical roller and a portion of surface along its longitudinal axis from said shouldered end on which said cylindrical roller may be mounted so as to be rotatable thereabout, said shaft having a threaded end opposite said shouldered end, so that said threaded end may be coupled to said at least one tapped opening of said housing through the clearance opening of said support member by being threaded thereinto, said shaft being adapted to be moved in directions perpendicular to said front panel so that said clips fastened to said housing are engaged in said pair of notches in said support member, thereby substantially controlling the distance between said tape guide ring and the shoulder of said cylindrical roller, said distance being substantially equal to the width of tape to be guided by said tape guide by rolling over said rotatable roller, said distance being further controllable so as to substantially reduce frictional forces between the edges of said guided tape and the rotatable tape guide ring and the shoulder of said rotatable roller by varying the position of coupling of said shaft and said housing.

6. The adjustable tape guide post defined by claim 5 further including:

retaining means for coupling said housing to said threaded end of said shaft after said threaded end has been threaded into the tapped opening of said housing for preventing the decoupling of said housing and said shaft without first removing said retaining means.

7. The adjustable tape guide post defined by claim 6 wherein said distance is substantially equal to the width of a five-level punched tape.

8. The adjustable tape guide post defined by claim 6 wherein said distance is substantially equal to the width of a seven-level punched tape.

9. The adjustable tape guide post defined by claim 6 wherein said distance is substantially equal to the width of an eight-level punched tape.

10. An adjustable tape guide post comprising:

a main support member having a clearance opening along the longitudinal axis thereof, a shoulder about one end, and at least first and second notches at predetermined first and second spacings, respectively, from its other end;

a tape guide ring adapted to be mounted on the shouldered end of said main support member so as to be rotatable thereabout;

coupling means adapted to couple said main support member to a front panel of a device utilizing tape so that the shouldered end of said main support member and said tape guide ring which is rotatably mounted thereon are disposed on the front of said front panel, and said at least first and second pairs of slots are disposed behind said front panel;

a housing having at least one tapped opening;

resilient clipping means fastened to said housing and adapted to couple said housing and said support member with a first distance relationship by being engaged with said first notch in said support member, said resilient clipping means further being adapted to couple said housing and said support member with a second distance relationship by being engaged with said second notch in said support member, the longitudinal axis of said tapped opening in said housing and the axis of the clearance opening of said support member being substantially aligned in a straight line when said housing and support member are coupled with either said first or second distance relationship;

a cylindrical roller having a shoulder about one end thereof and an opening along its longitudinal axis, the outside diameter of said cylindrical roller being substantially equal to but not greater than the clearance opening of said support member;

an adjustable cylindrical shaft having a shoulder at one end thereof, the diameter of said shoulder being greater than the diameter of the opening along the longitudinal axis of said cylindrical roller, and a portion of surface along its longitudinal axis from said shouldered end on which said cylindrical roller may be mounted so as to be rotatable thereabout, said shaft having a threaded end opposite said shouldered end, so that said threaded end may be coupled to said at least one tapped opening of said housing through the clearance opening of said support member by being threaded thereinto, said shaft being movable in directions perpendicular to said front panel so that said resilient clipping means engage with either said first or said second notch, thereby controlling the distance between said tape guide ring and the shouldered end of said cylindrical roller to be equal to first and second values which are substantially equal to the respective widths of first and second tapes to be guided by said tape guide by rolling over said rotatable roller, said first and second distance values being further controllable so as to substantially reduce frictional forces between the edges of said guided tapes and the rotatable tape guide ring and the shouldered end of said rotatable roller by varying the position of coupling of said shaft and said housing.

11. The adjustable tape guide post defined by claim 10 wherein said first and second distance values between said tape guide ring and the shouldered end of said rotatable cylindrical roller are substantially equal to the width dimensions of five-level punched tape and eight-level punched tape, respectively.

12. The adjustable tape guide post defined by claim 10 further including:

retaining means for coupling said housing to said threaded end of said shaft after said threaded end has been threaded into the tapped opening of said housing for preventing the decoupling of said housing and said shaft without first removing said retaining means.

References Cited by the Examiner

UNITED STATES PATENTS

| | | | |
|---|---|---|---|
| 1,636,678 | 7/1927 | Benson | 287—20 X |
| 2,574,381 | 11/1951 | Erdelyi | 287—20 X |
| 2,734,615 | 2/1956 | Wallendael | 226—194 X |
| 2,916,228 | 12/1959 | Wellington | 242—76 |
| 3,024,957 | 3/1962 | Pinto | 226—199 X |

M. HENSON WOOD, Jr., *Primary Examiner.*

J. N. ERLICH, *Assistant Examiner.*